(12) United States Patent
Zambrano et al.

(10) Patent No.: US 7,537,645 B2
(45) Date of Patent: May 26, 2009

(54) HIGH FLOW AIR FILTRATION SYSTEM FOR DODGE TRUCK

(75) Inventors: Saul Daniel Zambrano, Quartz Hill, CA (US); Shahriar Nick Niakan, Anaheim Hills, CA (US); Eric Charles Bajza, Garden Grove, CA (US); Stuart T. Miyagishima, Upland, CA (US)

(73) Assignee: Advanced Flow Engineering, Inc., Corona, CA (US)

( * ) Notice: Subject to any disclaimer, the term of this patent is extended or adjusted under 35 U.S.C. 154(b) by 472 days.

(21) Appl. No.: 11/088,427

(22) Filed: Mar. 24, 2005

(65) Prior Publication Data

US 2005/0211095 A1    Sep. 29, 2005

Related U.S. Application Data

(60) Provisional application No. 60/634,044, filed on Dec. 7, 2004, provisional application No. 60/634,011, filed on Dec. 7, 2004, provisional application No. 60/556,171, filed on Mar. 24, 2004.

(51) Int. Cl.
*B01D 46/00* (2006.01)
(52) U.S. Cl. .............. 95/273; 55/385.3; 123/198 E
(58) Field of Classification Search ............... 55/385.3, 55/504, 505; 123/198 E; 95/273
See application file for complete search history.

(56) References Cited

U.S. PATENT DOCUMENTS

| | | | | |
|---|---|---|---|---|
| 3,934,992 A | * | 1/1976 | Thompson | 55/324 |
| 4,440,555 A | * | 4/1984 | Chichester | 55/385.3 |
| 4,595,401 A | * | 6/1986 | Witchell | 55/385.3 |
| 5,865,863 A | * | 2/1999 | DeSousa et al. | 55/385.3 |
| 5,921,214 A | * | 7/1999 | Fujita et al. | 123/198 E |
| 6,162,271 A | * | 12/2000 | Bullinger et al. | 55/385.3 |
| 6,167,862 B1 | * | 1/2001 | Powell et al. | 123/198 E |
| 6,178,939 B1 | * | 1/2001 | Powell | 123/184.21 |
| 6,258,144 B1 | * | 7/2001 | Huang | 55/385.3 |
| 6,287,354 B1 | * | 9/2001 | Nozaki | 55/385.3 |
| 6,540,806 B2 | * | 4/2003 | Reinhold | 55/490 |
| 6,716,263 B2 | * | 4/2004 | Inoue et al. | 55/385.1 |
| 6,716,264 B2 | * | 4/2004 | Onoda | 55/385.3 |
| 6,840,973 B2 | * | 1/2005 | Kuji et al. | 55/385.3 |
| 6,884,274 B2 | * | 4/2005 | Niakan et al. | 55/486 |
| 6,902,598 B2 | * | 6/2005 | Gunderson et al. | 55/498 |
| 7,152,633 B2 | * | 12/2006 | White | 138/149 |
| 2005/0061292 A1 | * | 3/2005 | Prellwitz et al. | 123/198 E |
| 2005/0076621 A1 | * | 4/2005 | Chang | 55/320 |

* cited by examiner

*Primary Examiner*—Duane S Smith
*Assistant Examiner*—Robert A Clemente
(74) *Attorney, Agent, or Firm*—Paul J. Backofen, Esq.; Crockett & Crockett (57) ABSTRACT

An air filtration system for a vehicle includes a filter housing comprising a first wall, a second wall, and a center wall disposed between the first and second walls. An intermediate tube is disposed within an outlet port in the center wall. An air intake tube is coupled between the intermediate tube and the inlet of a stock turbocharger for a turbo-diesel L6 5.9 Liter engine. Methods for providing filtered air to a turbo-diesel internal combustion engine are also disclosed.

14 Claims, 10 Drawing Sheets

FIG. 8B

HIGH FLOW AIR FILTRATION SYSTEM FOR DODGE TRUCK

CROSS-REFERENCE TO RELATED APPLICATIONS

This application claims the benefit of U.S. Provisional Patent Application No. 60/634,044 filed on Dec. 7, 2004; U.S. Provisional Patent Application No. 60/634,011 filed on Dec. 7, 2004; and U.S. Provisional Patent Application No. 60/556,171, filed on Mar. 24, 2004.

BACKGROUND OF THE INVENTION

This invention relates to air filtration systems for motorized vehicles, and in particular, to high performance air filtration systems for use with turbocharged vehicles, such as Dodge pickup trucks having a 5.9 Liter, L6 turbo-diesel engine.

The function of an air intake filter is to remove particulate matter from the intake air, so that clean air is provided to the engine. The intake air stream flows from the influent, or "dirty," side of the filter to the effluent, or "clean," side of the filter, with the air filter extracting the unwanted particles via one or more filter media layers. Filter media are selected to trap particles exceeding a particular size, while remaining substantially permeable to airflow over an expected filter lifetime.

The features and filter design choices that lead to improvements in one of these parameters (e.g., particle entrapment, airflow permeability, and filter lifetime) can lead to declines in the other performance parameters. Thus, filter design involves trade-offs among features achieving high filter efficiency, and features achieving a high filter capacity and concomitant long filter lifetime.

As used herein, filter efficiency is the propensity of the filter media to trap, rather than pass, particulates. Filter capacity is typically defined according to a selected limiting pressure differential across the filter, typically resulting from loading by trapped particulates. Volumetric filter flow rate, or flow rate, is a measure of the volume of air that can be drawn into a given filter having a particular effective filter area, efficiency, and capacity, at a particular point in the expected filter lifetime.

The choice of filter media having a high filter efficiency (wherein the filter media removes a high percentage of the particulate material in the intake air) is important, because any particulate matter passing through the filter may damage the engine. For filtration systems of equal efficiency, a longer filter lifetime typically is directly associated with higher capacity, because the more efficiently the filter medium removes particles from an air stream, the more rapidly that filter medium approaches the pressure differential indicating the end of the filter medium life. To extend filter lifetime, filter media can be pleated to provide greater filtering surface area.

The choice of air filter media that is permeable to airflow is important because the interposition of the filter into the engine intake air stream can impede the airflow rate. Decreased airflow rate tends to decrease engine efficiency, horsepower, torque, and fuel economy. Increased airflow rate through a vehicle's air filtration system, and/or the passage of cooler air therethrough, may improve engine performance. In applications demanding large volumes of filtered air, the ability to manipulate parameters such as air filter size, pleat depth, or both, is often constrained additionally by the physical environment in which the filter is operated (e.g., the space available for a filter of a given configuration within the engine compartment of a vehicle).

Some prior art air filters have been designed to provide increased filter flow rate. However, such designs may foster air turbulence at the filter inlet, which is an undesirable quality which may ultimately impair airflow. Also, some existing filter designs employ abrupt topological transitions, such as a one-step ring, a ledge, an edge, or a peak, which tend to encourage the development of air eddies and to reduce airflow into the filter. When air eddies cause influent air to bypass regions of the filter media near these abrupt transitions, the effective area of the filter available for filtration is reduced.

Prior art filters using pleated media often secure one or both ends of the pleated media to a filter housing in such a manner that the pleats are forced together, such that air cannot flow between adjacent pleats. In this situation, the effective area of a pleated filter media available for filtration is reduced.

As can be seen, there is a need for an improved air filtration system for an internal combustion engine for achieving high efficiency filtration of intake air. Furthermore, there is a need for an improved filtration apparatus for achieving high volumetric airflow rate and maximum effective area available for filtration.

SUMMARY OF THE INVENTION

In one aspect of the present invention, an air filtration system comprises a filter housing; an intermediate tube affixed to the filter housing; and an air intake tube coupled to an external portion of the intermediate tube, wherein the air intake tube includes a downstream portion, and the air intake tube is configured for coupling the downstream portion of the air intake tube to a turbocharger inlet.

In another aspect of the present invention, there is provided an air filtration system comprising a filter housing adapted for receiving a filter element; an intermediate tube affixed to, and extending from, the filter housing; and an air intake tube having an upstream portion adapted for coupling to the intermediate tube, the air intake tube further having a downstream portion adapted for coupling to a turbocharger inlet, wherein the filter housing comprises a metal box having a housing inlet adapted for flow of ambient air to the filter element, and the air intake tube is in fluid communication with each of the intermediate tube, the filter element, and the filter housing.

In a further aspect of the present invention, an air filtration system comprises a filter housing; a filter element disposed in the filter housing; and an air intake tube in fluid communication with the filter element, wherein the filter housing comprises a center wall, an outlet port disposed in the center wall, and an intermediate tube disposed within the outlet port. An internal portion of the intermediate tube is disposed within the filter housing, the filter element is coupled to the internal portion of the intermediate tube, and an upstream portion the air intake tube is coupled to an external portion of the intermediate tube.

In still a further aspect of the present invention, an air filtration system comprises a filter housing adapted for receiving a filter element; an intermediate tube affixed to the filter housing via an outlet port in the filter housing; and an air intake tube in fluid communication with the filter housing. The filter housing comprises a center wall having the outlet port disposed therein, a first wall contiguous with the center wall, a second wall opposite the first wall, a housing inlet adapted for flow of ambient air into the filter housing, and a lid adapted for attachment to an upper edge of the filter housing. An internal portion of the intermediate tube is disposed within the filter housing, the internal portion of the intermediate tube is adapted for receiving the filter element, an external portion of the intermediate tube is disposed outside the filter housing, the external portion of the intermediate tube is adapted for coupling to an upstream portion of the air intake tube, and the filter housing comprises a metal or plastic.

In yet a further aspect of the present invention, a method for filtering ambient air for an internal combustion engine comprises shielding a filter element from engine-derived heat in an engine compartment of a vehicle, wherein the filter element is disposed within a filter housing having a center wall, and the filter element is coupled to an intermediate tube projecting through the center wall and into the filter housing; passing the ambient air through the filter element to provide filtered air; and passing the filtered air from the filter element to the internal combustion engine via an air intake tube having a downstream portion coupled to an inlet of a turbocharger of the vehicle.

These and other features, aspects, and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an air filtration system and methods for delivering filtered air to the intake of an internal combustion engine of a vehicle, such as a turbo-diesel engine of a 1994 to 2002 5.9 Liter Dodge turbo-diesel pickup truck.

An embodiment of the present invention may be distinguished from the prior art in having, inter alia, a filter housing including a center wall disposed between and contiguous with a first and a second wall, wherein an internal portion of an intermediate tube extends through the center wall for coupling to a filter element, and an external portion of the intermediate tube is coupled to an upstream portion of an air intake tube. The air intake tube may have a plurality of curved portions interposed between a plurality of straight portions. In some embodiments, the present invention may be further distinguished from the prior art in having an intake tube shield disposed adjacent to, or at least partially encircling, the air intake tube. The present invention may be still further distinguished from the prior art in having a filter housing, intermediate tube, and air intake tube configured and adapted for installation within a stock, or original equipment manufacturer (OEM), engine compartment of a Dodge pickup truck having a 5.9 Liter L6 turbo-diesel engine.

Figure 1A:
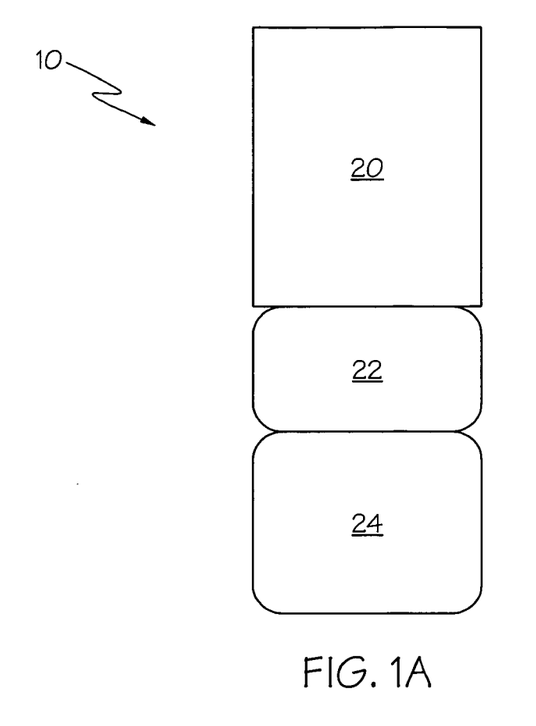
FIG. 1A is a plan view of an automotive vehicle, according to the present invention.

FIG. 1A is a schematic plan view of an automotive vehicle 10 including a bed 20, a cab 22 disposed forward of bed 20, and an engine compartment 24 disposed forward of cab 22. Engine compartment 24 may be open or may be covered by a hood (not shown). Vehicle 10 may be a truck, such as a Dodge pickup truck.

Figure 1B:
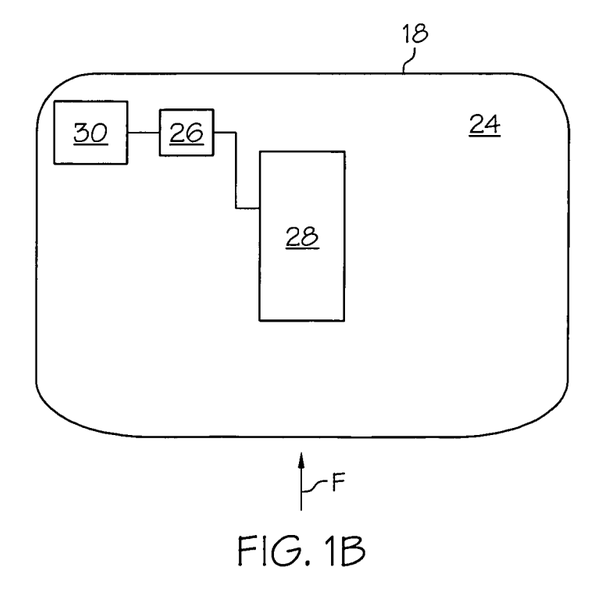
FIG. 1B is a plan view of an engine compartment of a vehicle, according to the present invention.

FIG. 1B is an enlarged schematic plan view of an engine compartment 24 of vehicle 10, according to the present invention. A front portion of engine compartment 24 is indicated in FIG. 1B by the arrow labeled F. Engine compartment 24 may accommodate a high flow air filtration system 30. As shown in FIG. 1B, air filtration system 30 may be located at a right rear portion of engine compartment 24, for example, adjacent to firewall 18 of vehicle 10.

Air filtration system 30 may be in fluid communication with a turbocharger 26 of vehicle 10. Turbocharger 26 may be coupled to, and in fluid communication with, an internal combustion engine 28. Turbochargers for internal combustion engines are well known in the art. Internal combustion engine 28 may be a diesel engine. As an example, internal combustion engine 28 may be a stock, or OEM, engine for a truck; and turbocharger 26 may be an OEM turbocharger. In some embodiments of the present invention, internal combustion engine 28 may be a 5.9 L L6 turbo-diesel engine, and vehicle 10 may be a 1994 to 2002 model year Dodge pickup truck.

Figure 2A:
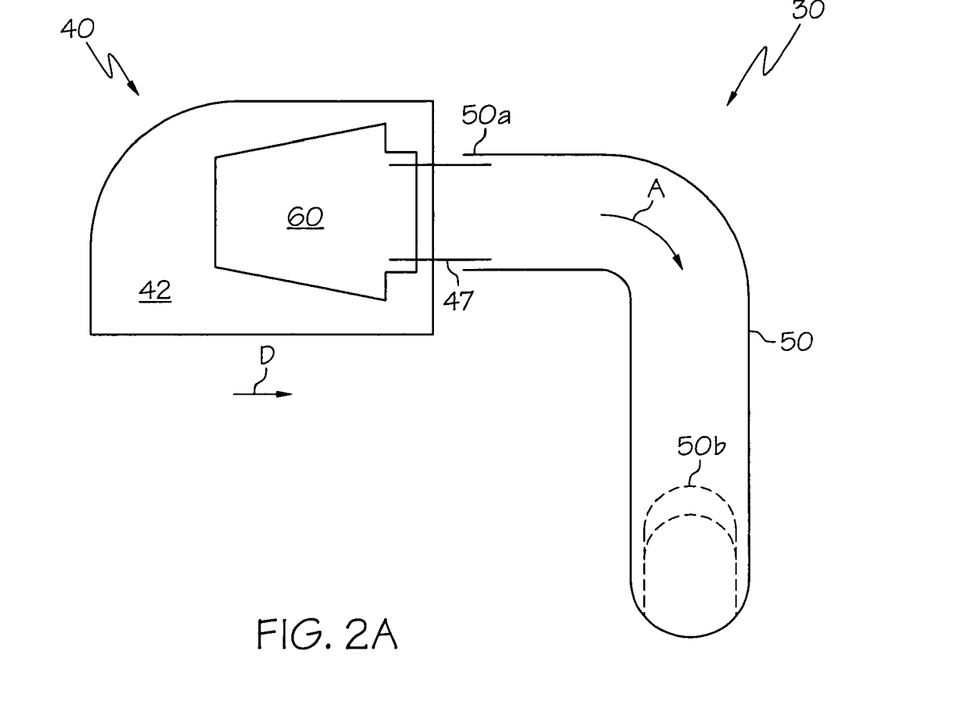
FIG. 2A is a side view of an air filtration system including a filter housing, an intermediate tube, and an air intake tube, according to an embodiment of the present invention.
Figure 2B:
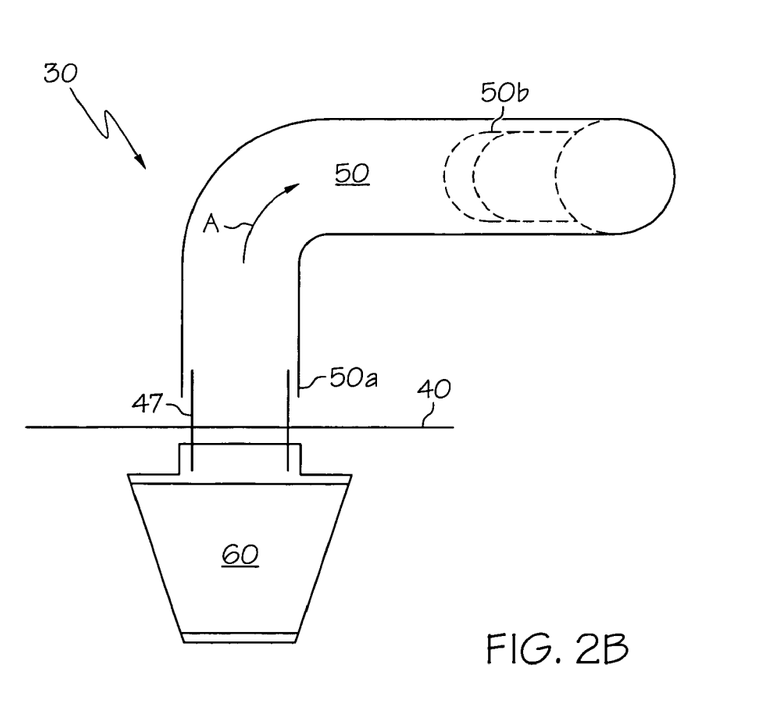
FIG. 2B is a plan view of the air filtration system of FIG. 2A with the filter housing omitted.

With reference to FIGS. 2A-B, FIG. 2A is a side view of an air filtration system 30, and FIG. 2B is a plan view of the air filtration system of FIG. 2A, according to the present invention. Air filtration system 30 may include a filter housing 40, and an air intake tube 50 in fluid communication with filter housing 40 via an intermediate tube 47. Intermediate tube 47 may be a metal tube affixed to, and extending into, filter housing 40. Filter housing 40 may comprise, as an example, cold rolled steel, stainless steel, or aluminum. Filter housing 40 may be a metal box having an opening or housing inlet 49 (see, for example, FIG. 3F) adapted for allowing flow of ambient air to the filter element. Filter housing 40 may be painted or powder coated. Intermediate tube 47 may comprise, as an example, cold rolled steel, stainless steel, or aluminum. In some embodiments, intermediate tube 47 may be integral with filter housing 40. Intermediate tube 47 may be welded to filter housing 40. In some embodiments, filter housing 40 may comprise plastic, and intermediate tube 47 may be integral with filter housing 40.

Air filtration system 30 may further include a filter element 60 disposed within filter housing 40. Filter element 60 may be coupled to, and in fluid communication with, intermediate tube 47 at a location upstream from air intake tube 50. The arrow labeled D in FIG. 2A indicates the downstream direction for air filtration system 30. Filter element 60 may be affixed to intermediate tube 47, for example, via a clamp, such as a hose clamp, as is well known in the art. Filter element 60 may have a frustoconical configuration. For example, filter element 60 may resemble a section of a cone, in which a base portion 65 of filter element 60 may correspond to a cone base, and a top of filter element 60 lies in a plane substantially parallel to the cone base (see, e.g., FIG. 6B). Filter element 60 may be adapted for filtering ambient air, and for providing an adequate volume, or flow rate, of filtered air to turbocharger 26 and internal combustion engine 28 (see, for example, FIG. 1B). Filter housing 40 is largely omitted from FIG. 2B for the sake of clarity.

With further reference to FIGS. 2A-B, an upstream portion 50a of air intake tube 50 may be coupled to intermediate tube 47. Air intake tube 50 may be in fluid communication with filter housing 40 via intermediate tube 47 and filter element 60. Air intake tube 50 may be a conduit for supplying filtered air to turbocharger 26. The airflow within air intake tube 50 may be in the direction indicated by the arrow labeled A. Air intake tube 50 may have a plurality of curves therein (see, for example, FIG. 4A). A downstream portion 50b may be adapted for coupling to an inlet of turbocharger 26 (FIG. 1B). (Downstream portion 50b of air intake tube 50 is shown in broken lines in FIGS. 2A-B.)

With reference to FIGS. 3A-F, FIG. 3A is a perspective view of a filter housing 40, according to the present invention. Filter housing 40 may include a first wall 42, a second wall 44, and a center wall 46. Center wall 46 may be disposed between first wall 42 and second wall 44, and may be contiguous with both first wall 42 and second wall 44. Filter housing 40 may further include an outlet port 46a in center wall 46. Each of first, second, and center walls 42, 44, 46, respectively, may comprise a metal sheet. Filter housing 40 may further include an upper edge 41, which may extend along at least one of first, second, and center walls 42, 44, 46. Each of first and second walls 42, 44, may be disposed orthogonally, or substantially orthogonally, to center wall 46. By substantially orthogonal is meant within a range of typically about 15° from the perpendicular.

Again with reference to FIG. 3A, filter housing 40 may further include a housing floor 48 disposed between first wall 42 and second wall 44. Housing floor 48 may be disposed beneath filter element 60. At least one of housing floor 48, first wall 42, second wall 44, and center wall 46 may comprise, or function as, a heat shield, for example, to shield ambient air entering filter element 60 from engine-derived heat. Each of first wall 42, second wall 44, and center wall 46 may be disposed vertically or orthogonally to housing floor 48. Filter housing 40 may be configured to fit within a right rear portion of an engine compartment 24 of a stock or OEM Dodge truck, such as a 5.9 Liter L6 turbo-diesel pickup truck.

Figure 3A:
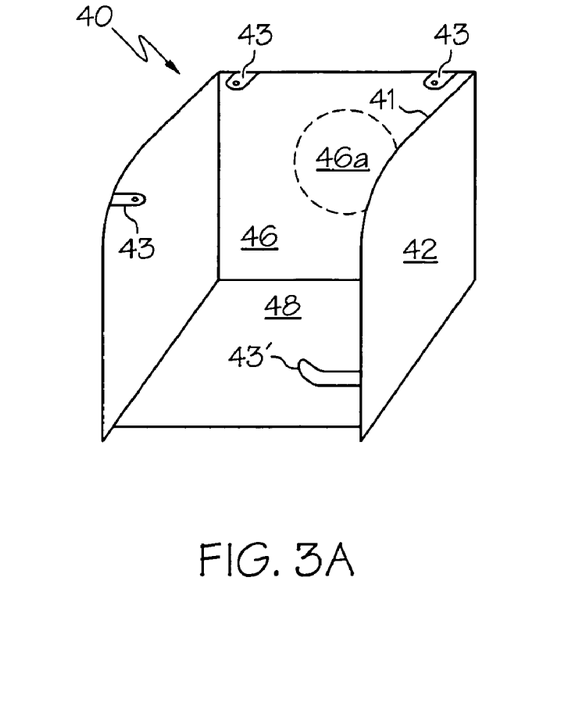
FIG. 3A is a perspective view of a filter housing showing an outlet port in a center wall of the filter housing, according to the present invention.
Figure 3B:
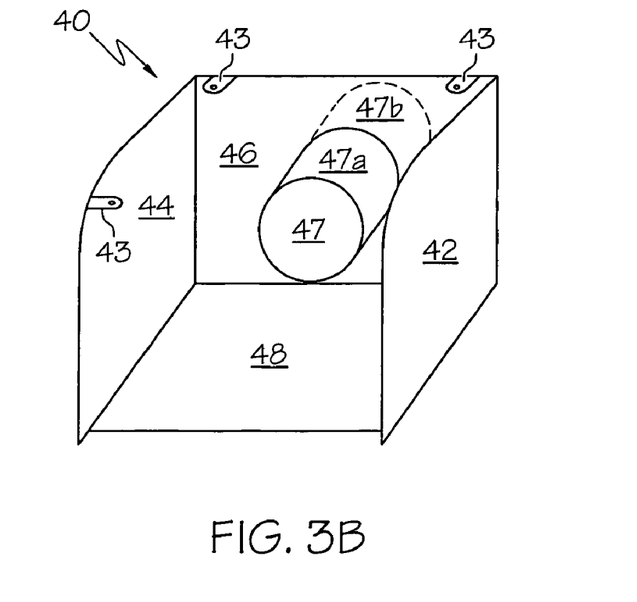
FIG. 3B is a perspective view of the filter housing of FIG. 3A, showing an intermediate tube extending through the center wall.
Figure 3C:
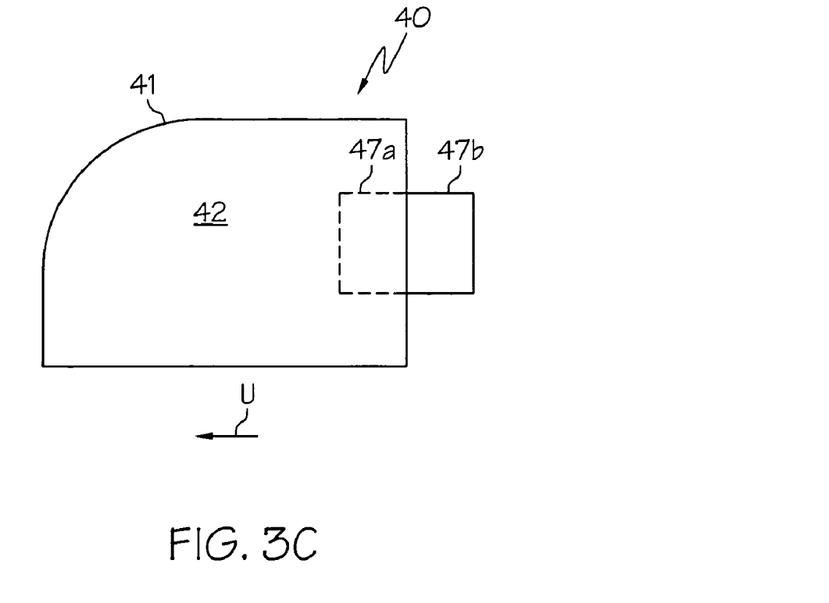
FIG. 3C is a side view of the filter housing of FIG. 3A.

With reference to FIGS. 3B-C filter housing 40 may further include an intermediate tube 47 disposed within outlet port 46a. Intermediate tube 47 may extend through center wall 46, and intermediate tube 47 may be disposed orthogonally, or substantially orthogonally, to center wall 46. Intermediate tube 47 may include an internal portion 47a and an external portion 47b. Internal portion 47a may be disposed within filter housing 40, while external portion 47b may be disposed outside filter housing 40. External portion 47b may be adapted for coupling to an upstream portion 50a of air intake tube 50 (see, for example, FIGS. 2A-B). At least one of first and second walls 42, 44 may curve downwards towards housing floor 48 with respect to an upstream direction. The upstream direction may be as indicated in FIG. 3C by the arrow, U.

With further reference to FIG. 3B, filter housing 40 may still further include one or more tabs 43, which may be disposed at upper edge 41. Other numbers and arrangements of tabs 43 are also within the scope of the present invention. Filter housing 40 may yet further include one or more mounting brackets 43'. Although a single mounting bracket 43' is shown in FIG. 3B, it is to be understood that other numbers and arrangements of mounting brackets 43' are also possible under the present invention. Mounting brackets 43' may be adapted for mounting filter housing within engine compartment 24 (FIG. 1B). In some embodiments, filter housing 40 may be adapted for installation at a location within engine compartment 24 formerly occupied by stock, or OEM, air filtration apparatus of a 1994 to 2002 model year turbo-diesel 5.9 Liter Dodge pickup, and mounting brackets 43' may be adapted for attachment to OEM mounting points of such a vehicle.

Figure 3D:
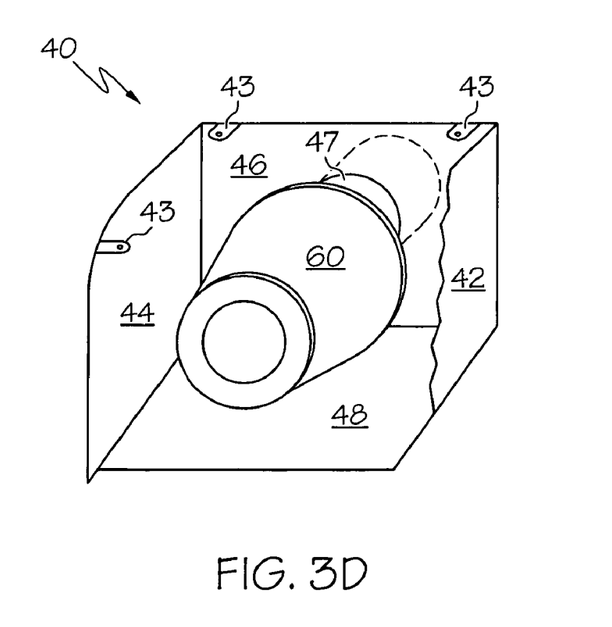
FIG. 3D is a perspective view of the filter housing of FIG. 3A, showing a filter element coupled to the intermediate tube.

FIG. 3D is a perspective view of filter housing 40 showing filter element 60 coupled to internal portion 47a of intermediate tube 47. Filter element 60 may include a base portion 65 adjacent or proximal to center wall 46 and a distal top portion 63. Top portion 63 may be narrower than base portion 65. First wall 42 is largely omitted from FIG. 3C for the sake of clarity.

Figure 3E:
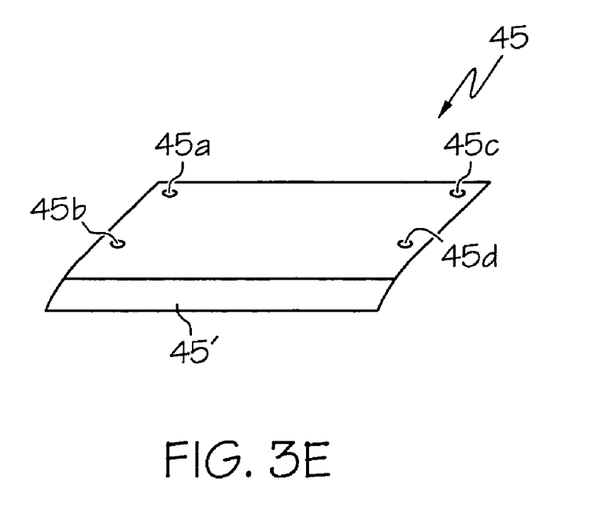
FIG. 3E is a perspective view of a lid for the filter housing of FIG. 3A.
Figure 3F:
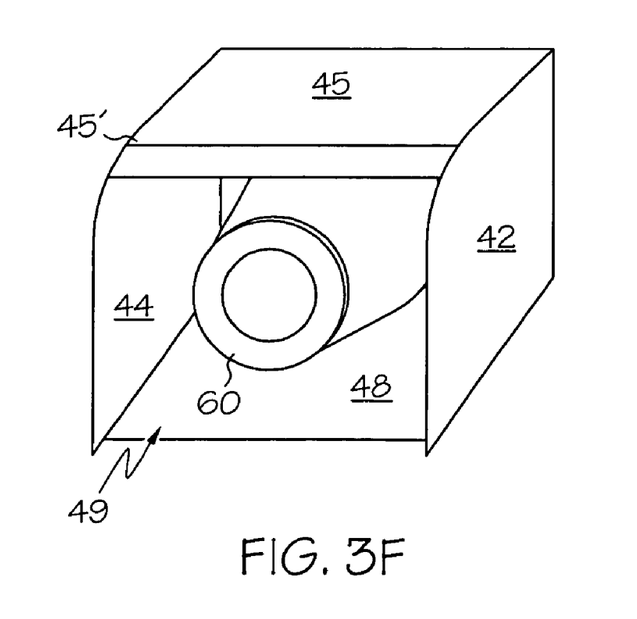
FIG. 3F is a perspective view of the filter housing of FIG. 3A showing a housing inlet with the lid in situ.

FIG. 3E is a perspective view showing a lid 45 for filter housing 40, and FIG. 3F is a perspective view of filter housing 40 with lid 45 in situ. Lid 45 may include a bevel 45' at an upstream edge of lid 45. Lid 45 may be in the form of a metal sheet, and lid 45 may include apertures 45a-d therethrough. Naturally, other numbers and arrangements of apertures 45a-d are also within the scope of the present invention. Apertures 45a-d may be configured for fastening lid 45 to filter housing 40, e.g., via tabs 43. Lid 45 may be removable, for example, lid 45 may be readily attached to, and detached from, filter housing 40 via fasteners (not shown) through apertures 45a-d and tabs 43.

With reference to FIG. 3F, filter housing 40 may include a housing inlet 49, which may be adapted for allowing flow of ambient air into the interior of filter housing 40 and thence to filter element 60. Housing inlet 49 may be disposed upstream from top portion 63 of filter element 60. Housing inlet 49 may be defined jointly by bevel 45' of lid 45, housing floor 48, and first and second walls 42, 44. Alternative inlet configurations (not shown) for filter housing 40 are also within the scope of the invention.

Figure 4A:
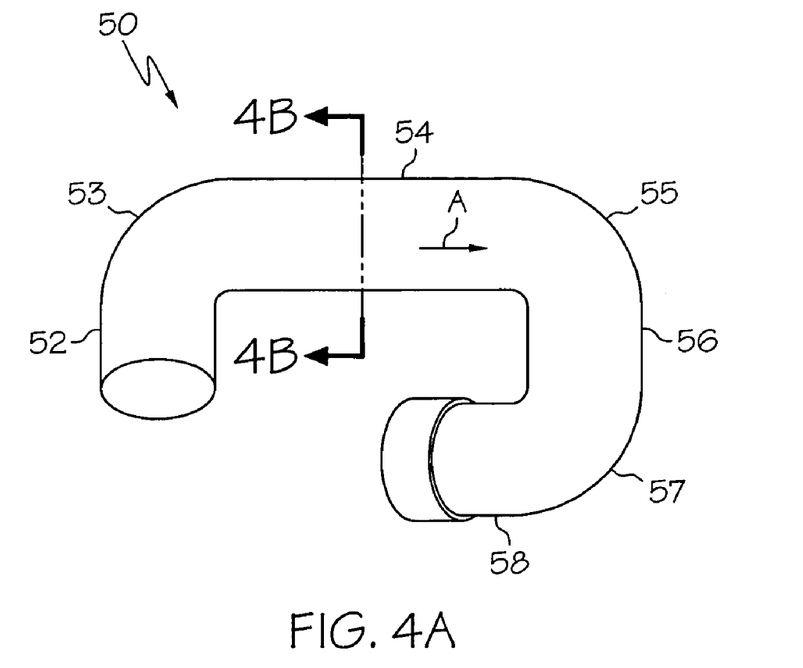
FIG. 4A is a perspective view of an air intake tube for an air filtration system, according to the present invention.

FIG. 4A is a perspective view of an air intake tube 50 for air filtration system 30, according to an embodiment of the present invention. Air intake tube 50 may include an upstream portion 50a and a downstream portion 50b. The direction of airflow within air intake tube 50, from upstream portion 50a to downstream portion 50b, may be indicated by the arrow, A. Upstream portion 50a may be adapted for coupling to intermediate tube 47, while downstream portion 50b may be adapted for coupling to the inlet of turbocharger 26.

Again with reference to FIG. 4A, air intake tube 50 may include a plurality of straight portions and a plurality of curved portions interposed between adjacent straight portions. For example, air intake tube 50 may include a first straight portion 52, a first curved portion 53 downstream from first straight portion 52, a second straight portion 54 downstream from first curved portion 53, and a second curved portion 55 downstream from second straight portion 54. Air intake tube 50 may further include a third straight portion 56 downstream from second curved portion 55, a third curved portion 57 downstream from third straight portion 56, and a fourth straight portion 58 downstream from third curved portion 57. First straight portion 52 may be at least substantially orthogonal to second straight portion 54.

With further reference to FIG. 4A, first curved portion 53 may curve downstream to the right, whereas third curved portion 57 may curve downstream to the left. Second curved portion 55 may curve downwards, i.e., towards the ground, when air intake tube 50 is installed in vehicle 10, such that third straight portion 56 may be disposed vertically, or substantially vertically. By substantially vertically is meant within a range of typically about 20° from the vertical. Third straight portion 56 may be at least substantially orthogonal to second straight portion 54, while fourth straight portion 58 may be at least substantially orthogonal to third straight portion 56.

Air intake tube 50 may be configured or adapted for coupling between intermediate tube 47 and turbocharger 26 of a particular vehicle model, such as a turbo-diesel Dodge pickup truck having a 5.9 Liter, L6 engine. Air intake tube 50 may have a diameter in the range of from about 4.0 to 6.0 inches, and typically from about 4.5 to 5.5 inches.

Figure 4B:
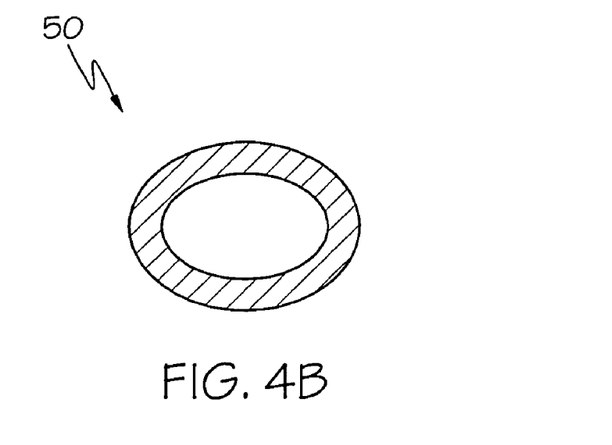
FIG. 4B is a sectional view of the air intake tube of FIG. 4A, taken along the lines 4B-4B.

FIG. 4B is a sectional view of air intake tube 50, taken along the lines 4B-4B of FIG. 4A. Air intake tube 50 may be circular, oval, or elliptical in cross-section. Air intake tube 50 may be installed in vehicle 10 in a configuration such that air intake tube 50 may be exposed to a nearby source of heat, such as engine 28 and/or turbocharger 26. Accordingly, air intake tube 50 may comprise a heat resistant material, such as a synthetic resin, which is adapted for withstanding temperatures of up to about 400° F. As a non-limiting example, air intake tube 50 may comprise a heat resistant nylon, such as Nylene® Nylon 6. In alternative embodiments, air intake tube 50 may comprise metal, such as powder coated steel, stainless steel, or aluminum.

Figure 5A:
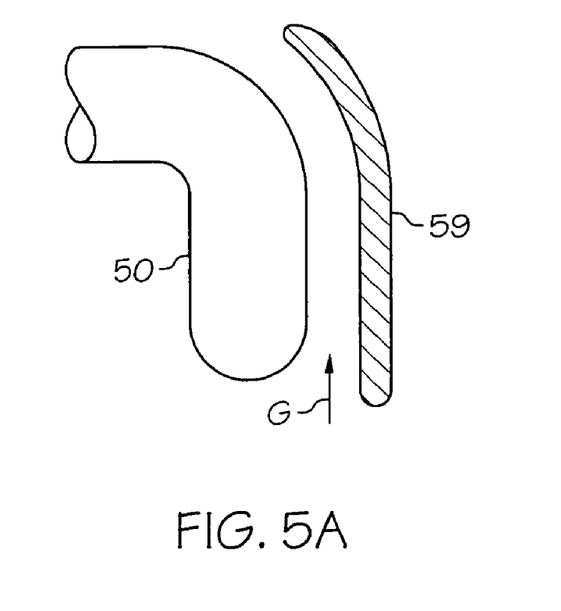
FIG. 5A is a side view of an air intake tube and an intake tube shield for the air intake tube, according to another embodiment of the invention.
Figure 5B:
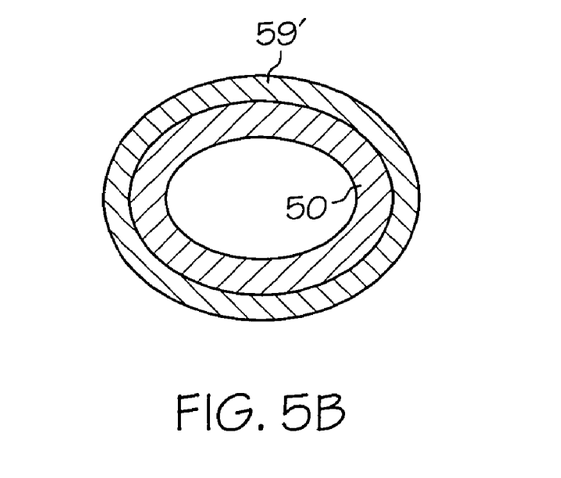
FIG. 5B is a sectional view of an air intake tube having an integral intake tube shield, according to another embodiment of the invention.

With reference to FIGS. 5A-B, in alternative embodiments of the present invention, air intake tube 50 may be protected from heat, such as engine-derived heat, by an intake tube shield 59/59'. Intake tube shield 59/59' may at least partially encircle air intake tube 50.

FIG. 5A is a side view of air intake tube 50 and an intake tube shield 59 for shielding air intake tube 50 from heat, such as heat generated within engine compartment 24 (FIG. 1B).

In some embodiments of the present invention, intake tube shield 59 may comprise a metal sheet disposed adjacent to air intake tube 50. Intake tube shield 59 may at least partially follow a contour or configuration of at least a portion of air intake tube 50. An air gap, labeled G, may be disposed between intake tube shield 59 and air intake tube 50.

FIG. 5B is a sectional view of air intake tube 50 having an intake tube shield 59', according to another embodiment of the invention. Intake tube shield 59' may be integral with air intake tube 50. Intake tube shield 59' may completely or partially surround, or encircle, air intake tube 50. Intake tube shield 59' may comprise, as non-limiting examples, a temperature resistant synthetic polymer or co-polymer, a braided metal sheath, or a layer of composite material.

Figure 6A:
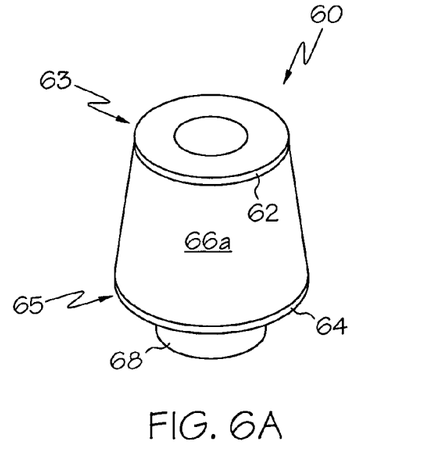
FIG. 6A is a perspective view of a filter element as seen from the top of the filter element, according to another embodiment of the invention.
Figure 6B:
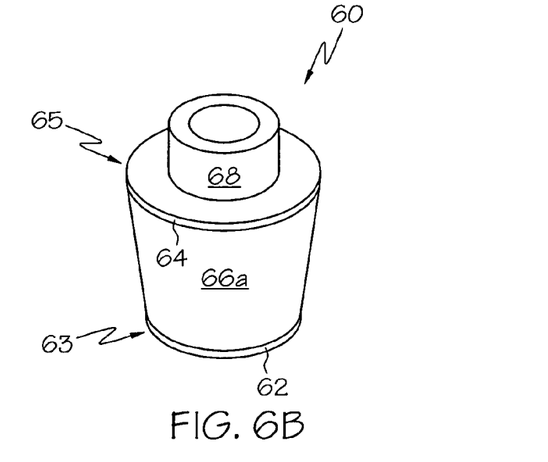
FIG. 6B is a perspective view of the filter element of FIG. 6A as seen from the base of the filter element.

With reference to FIGS. 6A-D, FIG. 6A is a perspective view of a filter element 60, as seen from the top of filter element 60, and FIG. 6B is a perspective view of filter element 60 as seen from base portion 65. Filter element 60 may be a component of air filtration system 30 of FIGS. 2A-B. Filter element 60 may include a top sealing ring 62 at a top portion 63 of filter element 60, and a base sealing ring 64 at a base portion 65 of filter element 60. Each of top portion 63 and base portion 65 may be circular or substantially circular. Filter element 60 may be cleansed with a suitable cleansing agent to remove entrapped particulate matter, and the like, and thereafter filter element 60 may be re-used.

Figure 6C:
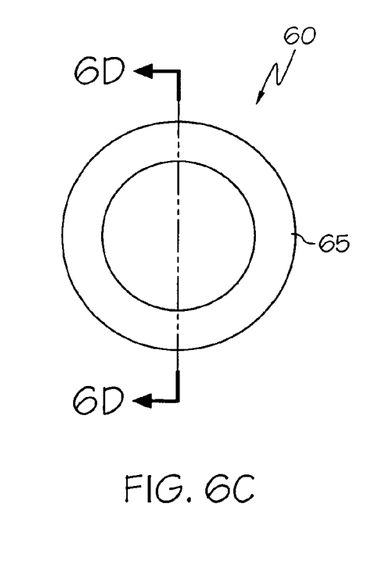
FIG. 6C is a plan view of the top portion of the filter element of FIG. 6A.
Figure 6D:
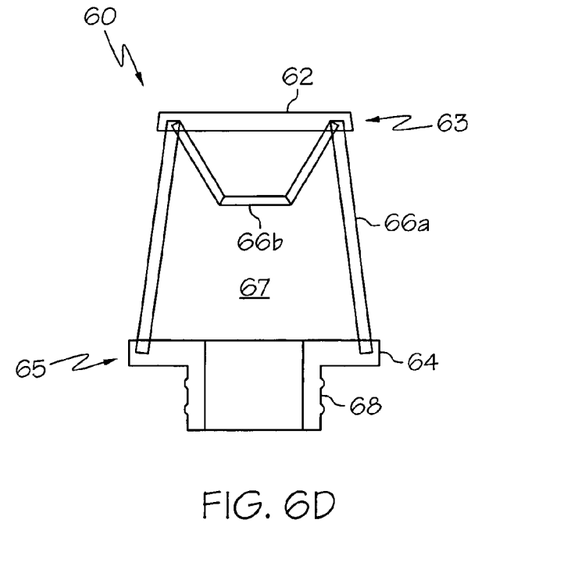
FIG. 6D is a sectional view of the filter element of FIG. 6A, taken along the lines 6D-6D.

FIG. 6C is an end view of base portion 65, and FIG. 6D is a longitudinal sectional view of filter element 60, taken along the line 6D-6D of FIG. 6C. Filter element 60 may further include an outer filtration unit 66a disposed between top sealing ring 62 and base sealing ring 64. Each of top sealing ring 62 and base sealing ring 64 may comprise a synthetic resin, such as a polyurethane resin. As can be seen in FIG. 6D, outer filtration unit 66a may define an internal void 67 therein. Filter element 60 may further include an inner filtration unit 66b disposed within void 67. Each of outer filtration unit 66a and inner filtration unit 66b may be frustoconical in configuration. Inner filtration unit 66b may be sealingly coupled to outer filtration unit 66a at top sealing ring 62.

Figure 7A:
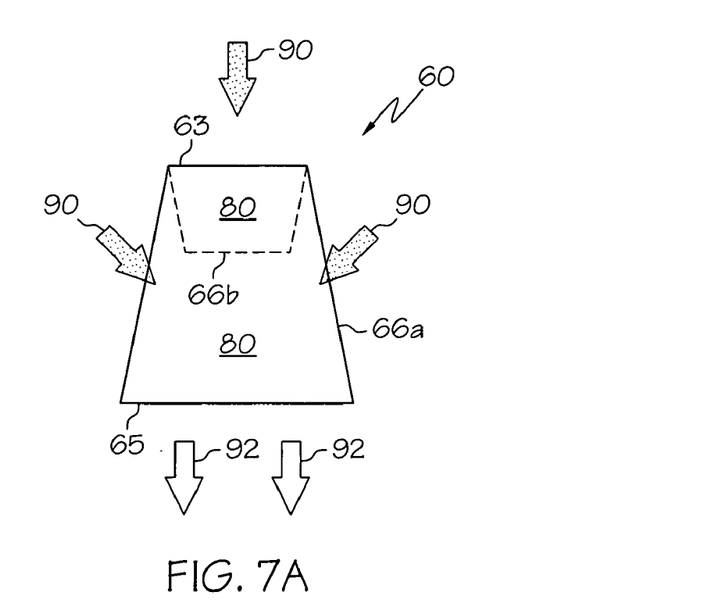
FIG. 7A is a sectional view of a filter element showing the direction of airflow during filtration of ambient air through a filter medium, according to another embodiment of the present invention.
Figure 7B:
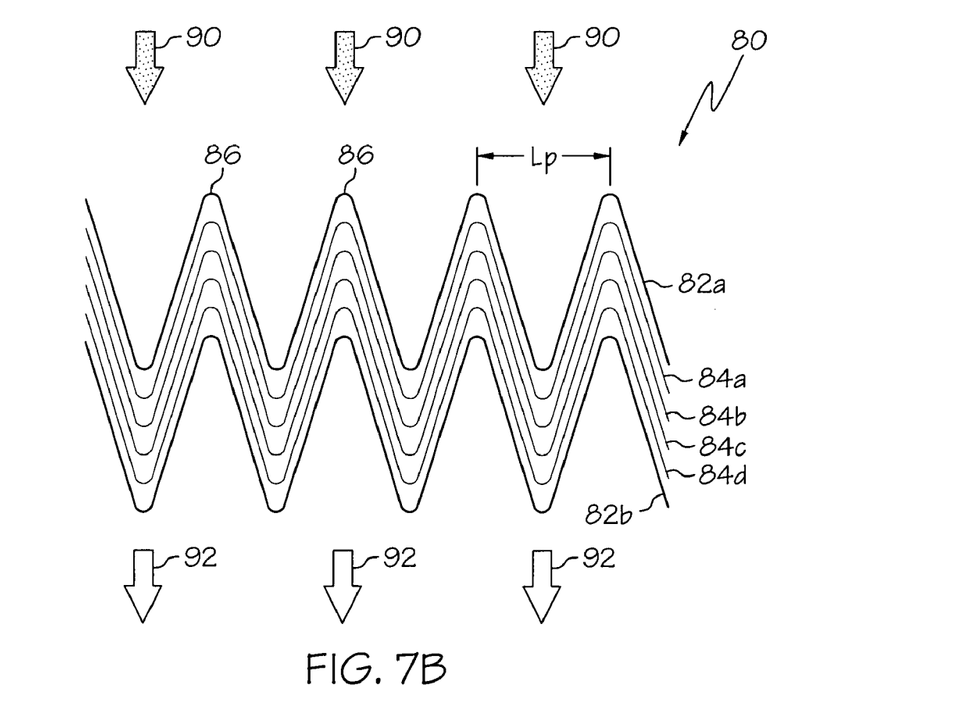
FIG. 7B is a sectional view of the filter medium of the filter element shown in FIG. 7A, according to an embodiment of the present invention.

Each of outer filtration unit 66a and inner filtration unit 66b may comprise a filter medium 80 (see, for example, FIGS. 7A-B). Filter element 60 may still further include a sleeve portion 68. Sleeve portion 68 may be adapted for coupling filter element 60 to an internal portion 47a of intermediate tube 47. Sleeve portion 68 may be adapted for receiving a hose clamp (not shown). Naturally, filter element configurations other than those illustrated in FIGS. 6A-D are also possible under the present invention.

FIG. 7A is a longitudinal sectional view of a filter element 60 indicating the direction of flow of ambient or unfiltered air 90 (solid arrows) through inner filtration unit 66b and outer filtration unit 66a to provide filtered air 92 (open arrows). As noted hereinabove with reference to FIG. 6D, each of outer filtration unit 66a and inner filtration unit 66b may comprise a filter medium 80. Ambient unfiltered air 90 may have particulate matter, such as dust, grit, and the like, entrained within a stream thereof; in contrast, filtered air 92 may be devoid, or substantially devoid, of entrained particulate matter. Each of outer filtration unit 66a and inner filtration unit 66b may be cleansed with a suitable cleansing agent and thereafter may be re-used. An air filtration apparatus and filter media thereof were disclosed in commonly assigned co-pending U.S. patent application Ser. No. 11/011,833, filed on Dec. 14, 2004, the disclosure of which is incorporated by reference herein in its entirety.

FIG. 7B is a sectional view of a filter medium 80 for a filter element 60, according to an embodiment of the present invention, schematically representing filtration of ambient unfiltered air 90 through filter medium 80 to provide filtered air 92. Filter medium 80 may comprise an outer structural support layer 82a, an inner structural support layer 82b, and one or more fabric layers 84a-d. Each fabric layer 84a-d may comprise a natural or synthetic fabric. In some embodiments, filter medium 80 may comprise at least four fabric layers 84a-d of natural or synthetic material.

With further reference to FIG. 7B, each fabric layer 84a-d may comprise, as non-limiting examples, a layer of cotton gauze or a layer of polyester fabric. It is to be understood that the invention is by no means limited to four fabric layers 84a-d, but rather other numbers of layers are within the scope of the invention. An efficacious quantity of oil (not shown) may be applied to filter medium 80 to improve the filtration efficiency thereof. The application of oil to filter media is known in the art. Filter media for an air filtration apparatus were disclosed in commonly assigned U.S. Pat. No. 6,811,588, the disclosure of which is incorporated by reference herein in its entirety.

Figure 8A:
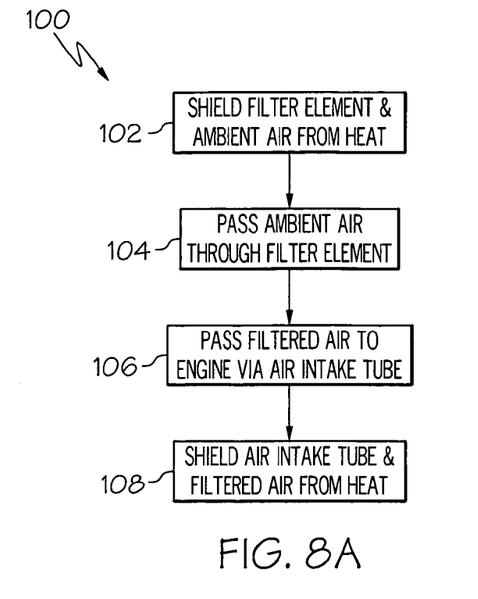
FIG. 8A schematically represents a series of steps involved in a method for providing filtered air to an internal combustion engine, according to another embodiment of the present invention.

FIG. 8A schematically represents a series of steps involved in a method 100 for filtering ambient air for an internal combustion engine, according to another embodiment of the present invention, wherein step 102 may involve shielding at least one of a filter element, such as filter element 60 and ambient air, such as ambient air 90 from engine-derived heat in an engine compartment, such as engine compartment 24 of a vehicle, such as vehicle 10. The filter element 60 may be disposed within a filter housing, such as filter housing 40 having a center wall, such as center wall 46 disposed between a first wall, such as first wall 42 and a second wall, such as second wall 44, a housing floor, such as housing floor 48, and a housing lid, such as housing lid 45 having a bevel, such as bevel 45'. The filter housing 40 may comprise at least one metal sheet, which may act as a heat shield. The heat shield may comprise at least one of the housing floor 48, the first wall 42, the second wall 44, and the center wall 46 of the filter housing 40. The filter element, such as filter element 60 may be coupled to an intermediate tube, such as intermediate tube 47 projecting through the center wall 46 into the filter housing, such as filter housing 40.

Step 104 may involve passing the ambient air, such as ambient air 90 through the filter element 60 to provide filtered air, such as filtered air 92. The ambient air 90 may be passed through the filter element 60 at a temperature below about 170° F., usually below about 150° F., and often below about 120° F. The filter housing, such as 40 may comprise a housing inlet, such as housing inlet 49 in fluid communication with an interior of the filter housing 40. The housing inlet 49 may be defined jointly by the bevel, such as bevel 45' of the housing lid, such as housing lid 45, the housing floor, such as housing floor 48, and the first and second walls 42, 44 of the filter housing, and step 104 may involve passing the ambient air 90 through the housing inlet 49.

Step 106 may involve passing the filtered air 92 from the filter element, such filter element as 60 to the internal combustion engine, such as internal combustion engine 28 via an air intake tube, such as air intake tube 50. The air intake tube, such as air intake tube 50 may have an upstream portion, such as upstream portion 50a coupled to the intermediate tube 47 and a downstream portion, such as downstream portion 50b coupled to an inlet of a turbocharger, such as turbocharger 26 of the vehicle, such as vehicle 10. Thus, step 106 may involve passing the filtered air 92 from the filter element 60 to the internal combustion engine, such as internal combustion engine 28 via the intermediate tube, such as intermediate tube 47. The air intake tube, such as air intake tube 50 may have a configuration defined by a plurality of curved portions and a plurality of straight portions, as described hereinabove, for example, with reference to FIG. 4A.

Optional step 108 may involve shielding the air intake tube 50 and the filtered air 92 from heat, such as heat generated within the engine compartment, such as engine compartment 24 of the vehicle, such as vehicle 10. The air intake tube, such as air intake tube 50 may be shielded from heat by an intake tube shield, such as intake tube shield 59. The intake tube shield 59 may comprise a metal sheet disposed adjacent to the air intake tube, such as air intake tube 50, such that the intake tube shield 59 may at least partially follow a contour of at least a portion of the air intake tube 50. In an alternative embodiment of the invention, the intake tube shield, such as intake tube shield 59' may be integral with the air intake tube, such as air intake tube 50, and the intake tube shield 59' may completely or partially surround, or encircle, the air intake tube 50.

Figure 8B:
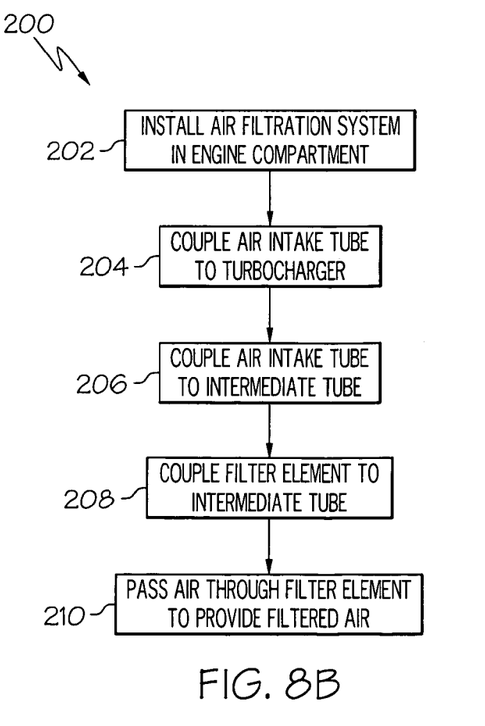
FIG. 8B schematically represents a series of steps involved in a method of filtering ambient air for an internal combustion engine, according to another embodiment of the present invention.

FIG. 8B schematically represents a series of steps involved in a method 200 of filtering ambient air, such as ambient air 90 for an internal combustion engine, such as internal combustion engine 28, according to another embodiment of the present invention. Step 202 of method 200 may involve installing a high flow air filtration system, such as air filtration system 30 in the engine compartment, such as engine compartment 24 of a vehicle, such as vehicle 10. The air filtration system, such as air filtration system 30 installed in step 202 may have elements, features, and characteristics as described hereinabove, for example, with reference to FIGS. 2A-8A. The air filtration system, such as air filtration system 30 may be installed in an OEM engine compartment, without modification of the stock engine compartment, other than removal of the OEM air filtration apparatus.

Step 204 may involve coupling a downstream portion, such as downstream portion 50b of an air intake tube, such as air intake tube 50 to the inlet of a stock turbocharger, such as 26 of the vehicle, such as 10. The air intake tube, such as air intake tube 50 may have elements, features, and characteristics as described hereinabove, for example, with reference to FIGS. 4A-B. Step 206 may involve coupling an upstream portion, such as upstream portion 50a of the air intake tube 50 to an external portion of an intermediate tube, such as intermediate tube 47, wherein the intermediate tube may comprise a plastic cylinder integral with the filter housing, or a metal cylinder affixed to the filter housing, as described hereinabove, for example, with reference to FIGS. 2A-B.

Step 208 may involve coupling a filter element, such as filter element 60 of the air filtration system, such as air filtration system 30 to an internal portion of the intermediate tube, such as intermediate tube 47, wherein the internal portion of the intermediate tube 47 may be disposed within the filter housing, such as filter housing 40, and the filter element, such as filter element 60 may be in fluid communication with the air intake tube 50. Step 210 may involve passing air, such as ambient unfiltered air 90, through the filter element 60 to provide filtered air, such as filtered air 92 to the turbocharger, such as turbocharger 26.

Providing filtered air, such as filtered air 92 to the internal combustion engine, such as internal combustion engine 28 according to embodiments of the present invention may improve engine performance, for example, by increasing at least one of horsepower, torque, and fuel economy.

It should be understood, of course, that the foregoing relates to exemplary embodiments of the invention and that modifications may be made without departing from the spirit and scope of the invention as set forth in the following claims.

We claim:

1. A method for filtering ambient air for an internal combustion engine, comprising:
   a) shielding a filter element from engine-derived heat in an engine compartment of a vehicle, wherein said filter element is disposed within a filter housing comprising a heat shield, wherein said filter housing comprises at least one metal sheet;
   b) passing said ambient air through a housing inlet in fluid communication with an interior of the filter housing and said filter element to provide filtered air the filter housing inlet being defined jointly by a level of a housing floor and the first and second walls of the filter housing;
   c) passing said filtered air from said filter element through an intermediate tube projecting through a center wall of said filter housing and into said filter housing; and
   d) passing said filtered air from said intermediate tube to said internal combustion engine via an air intake tube having a downstream portion coupled to an inlet of a turbocharger of said vehicle.

2. The method of claim 1, wherein said step a) comprises shielding said filter element via a heat shield comprising said filter housing, wherein said filter housing comprises at least one metal sheet.

3. The method of claim 1, wherein said step a) comprises shielding said filter element via a heat shield comprising at least one of a housing floor, a first wall, a second wall, and said center wall of said filter housing.

4. The method of claim 1, further comprising:
   e) via said filter housing, shielding said ambient air passing through said filter element from said engine-derived heat.

5. The method of claim 1, wherein said step b) comprises passing said ambient air through said filter element at a temperature below about 150 degree F.

6. The method of claim 1, further comprising:
   f) via an intake tube shield, shielding said air intake tube and said filtered air from heat.

7. The method of claim 1, wherein said step d) comprises passing said filtered air to said internal combustion engine via said air intake tube comprising:
   a first straight portion,
   a first curved portion downstream from said first straight portion,
   a second straight portion downstream from said first curved portion,
   a second curved portion downstream from said second straight portion,
   a third straight portion downstream from said second curved portion,
   a third curved portion downstream from said third straight portion, and
   a fourth straight portion downstream from said third curved portion, wherein:
      said first straight portion is at least substantially orthogonal to said second straight portion,
      said third straight portion is at least substantially orthogonal to said second straight portion, and
      said fourth straight portion is at least substantially orthogonal to said third straight portion,
      said first curved portion curves downstream to the right,
      said third curved portion curves downstream to the left,
      said first straight portion is coupled to said external portion of said intermediate tube, and
      said fourth straight portion is coupled to said turbocharger.

8. The method of claim 1, wherein: said internal combustion engine comprises a 5.9 Liter turbo-diesel engine, and said vehicle is a stock Dodge pickup truck.

9. The method of claim 1, wherein said step d) comprises passing said filtered air from said intermediate tube to said internal combustion engine via said air intake tube, said air intake tube having an upstream portion coupled to said intermediate tube.

10. An air filtration system, comprising:
    a filter housing formed of metal, the filter housing comprising:
       a first wall contiguous with said center wall,
       a second wall opposite said first wall, and
       a housing floor disposed between said first and second wall wherein said first wall curves downwards towards said housing floor;
       a lid adapted for attachment to an upper edge of said filter housing, and
       said lid comprises a bevel at an upstream edge of said lid;
    a filter element disposed in said filter housing; and
    an air intake tube in fluid communication with said filter element, wherein said filter housing comprises:
       a center wall, an outlet port disposed in said center wall, and
       an intermediate tube disposed within said outlet port, wherein:
          an internal portion of said intermediate tube is disposed within said filter housing, said filter element is coupled to said internal portion of said intermediate tube, and
          an upstream portion said air intake tube is coupled to an external portion of said intermediate tube.

11. The air filtration system of claim 10, wherein:
    said filter housing further comprises a housing inlet adapted for entry of ambient air into said filter housing, and
    said housing inlet is disposed opposite said center wall.

12. An air filtration system, comprising:
    a filter housing adapted for receiving a filter element;
    an intermediate tube affixed to said filter housing via an outlet port in said filter housing; and
    an air intake tube in fluid communication with said filter housing, wherein said filter housing comprises:
       a center wall having said outlet port disposed therein,
       a first wall contiguous with said center wall,
       a second wall opposite said first wall,
       a housing inlet adapted for flow of ambient air into said filter housing, and
       a lid adapted for attachment to an upper edge of said filter housing, the lid including a bevel,
       the housing inlet being defined jointly by the bevel, the housing floor and first and second walls wherein:
          an internal portion of said intermediate tube is disposed within said filter housing,
          said internal portion of said intermediate tube is adapted for receiving said filter element,
          an external portion of said intermediate tube is disposed outside said filter housing,
          said external portion of said intermediate tube is adapted for coupling to an upstream portion of said air intake tube, and
          said filter housing comprises a metal or plastic.

13. The air filtration system of claim 12, wherein said filter element includes:
- a base portion disposed adjacent said internal portion of said intermediate tube, and
- a top portion disposed upstream from said base portion, wherein said housing inlet is disposed upstream from said top portion.

14. The air filtration system of claim 12, wherein said filter element includes:
- a frustoconical outer filtration unit defining a void within said filter element, and
- a frustoconical inner filtration unit disposed within said void, wherein said outer filtration unit and said inner filtration unit each comprise a filter medium adapted for removing particulate matter from ambient air.

* * * * *